United States Patent

Zajac

[11] Patent Number: 5,944,330
[45] Date of Patent: Aug. 31, 1999

[54] LATHE MATES

[76] Inventor: Thomas Edward Zajac, 768 Garfield, Lincoln Park, Mich. 48146

[21] Appl. No.: 08/977,498

[22] Filed: Nov. 24, 1997

[51] Int. Cl.$^6$ .............................. B23B 31/16; B25B 1/24
[52] U.S. Cl. ...................... 279/151; 81/185.1; 269/263; 269/275; 269/281; 279/123
[58] Field of Search ........................ 279/123, 151–153, 279/43.6, 46.6; 269/259, 263, 271, 273–275, 279–281; 81/185.1

[56] References Cited

U.S. PATENT DOCUMENTS

| | | | |
|---|---|---|---|
| 917,387 | 4/1909 | Webb et al. | 269/281 |
| 1,799,019 | 3/1931 | Mischler et al. | 279/151 |
| 3,575,435 | 4/1971 | Lemanski | 279/123 |
| 4,252,305 | 2/1981 | Pasch | 269/274 |
| 4,772,034 | 9/1988 | Brown | 279/1 SJ |
| 5,015,003 | 5/1991 | Ramunas | 279/123 |
| 5,464,231 | 11/1995 | Clay | 279/123 |
| 5,542,686 | 8/1996 | Revuelta | 279/153 |

OTHER PUBLICATIONS

Clement Reichel, "Chuck Shoe" in American Machinist, p. 127, Aug. 14, 1957.

*Primary Examiner*—Steven C. Bishop
*Attorney, Agent, or Firm*—Patent & Trademark Services; Thomas Zack; Joseph H. McGlynn

[57] ABSTRACT

A non-surface marring work piece lathe mate pad which is interposed and held between the work piece and a lathe's chuck jaws. Each lathe mate has two grooved surfaces extending around three of its sides and flattened front and back surfaces which engage the work piece and lathe's chuck jaw. Disposed within these grooves are two continuous expandable strap members which extend around the lathe mates and the chuck jaws to retain them in place. These end grooves in each lathe mate prevent slipping of the expansion members with respect to rotatable work piece holding chuck jaws.

5 Claims, 1 Drawing Sheet

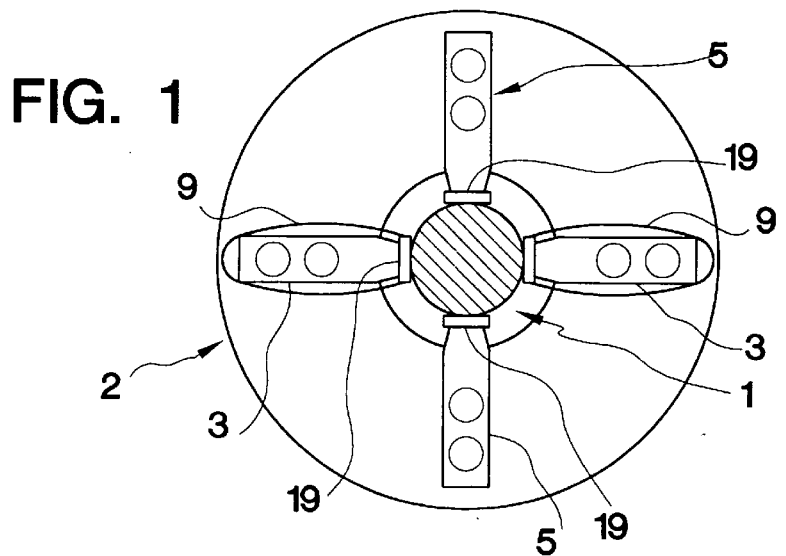
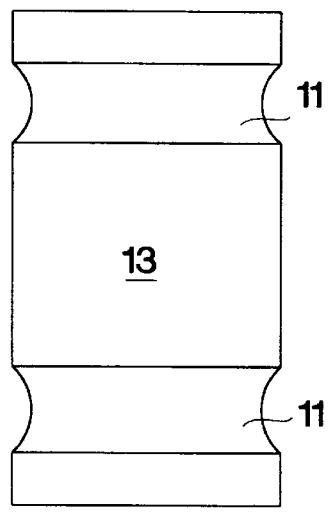
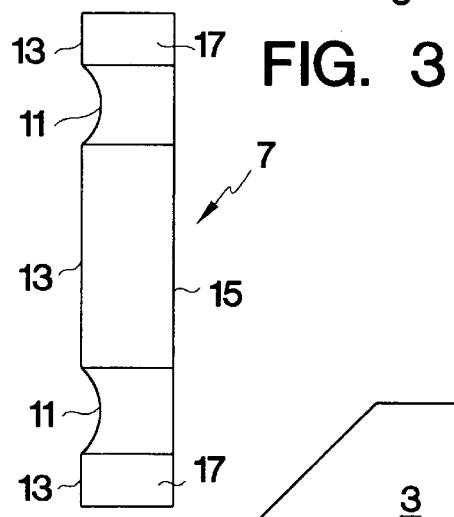
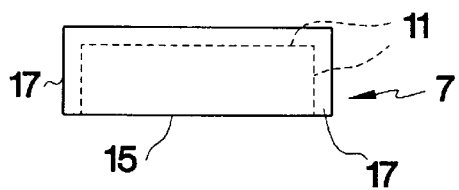
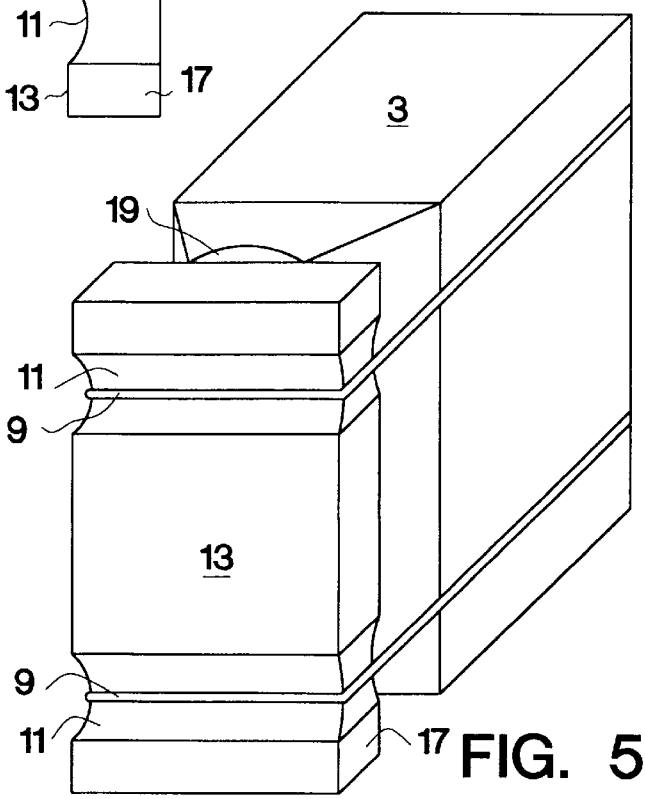

LATHE MATES

BACKGROUND OF THE INVENTION

Lathes are used to hold work pieces at their centers with chuck jaws as work pieces are turned in unison with the jaws while a fabrication operation is performed on the work piece. Normally the rotating work piece is contacted by a stationary or moving tool which performs the fabrication operation while the chuck jaws maintain the work piece in a horizontally disposed orientation. When the operation is initially performed and then inspected by removing the work piece from the chuck jaws, it is sometimes necessary to remount the work piece in the lathe's holding jaws to perform some further work piece modifications, refinements or a second different lathe operation on it. In order to do so, it is essential that the work piece not only be properly centered within the lathe's jaws but that it not be marred before the next operation is performed on the work piece. This remounting and centering of the work pieces within the lathe's jaws while not marring the previous finished work piece, especially for large shafts, can be time consuming. The present invention addresses this time consuming set up operation of the work piece by providing for the use of lathe mate pads with expandable extensions that engage the chuck jaws to prevent the marring of the work piece as further described herein.

DESCRIPTION OF THE PRIOR ART

Devices used in conjunction lathe jaws and a work piece are known. For example, in U.S. Pat. No. 4,772,034 to Brown soft jaws of a lathe chuck are engaged by studs of an adjustable lock ring device for holding the jaws during the machining thereof to fit a work piece.

In the Ramunas invention, U.S. Pat. No. 5,015,003, a top jaw assembly with a replaceable work holding is adapted to be mounted on the master jaw of a chuck.

The Clay reference (U.S. Pat. No. 5,464,231) discloses a chuck for holding a work piece wherein several jaw devices are detachably mounted in slots.

In U.S. Pat. No. 5,542,686 to Revuelta a chuck jaw manufacture is disclosed having a slug adapted to hold the work piece. In the present invention a set of two lathe mates disposed at approximately right angles to each other are each held to one of the lathe's chuck jaws by expandable continuous members which extend to correspondingly oriented lathe mates to the chuck jaws that are centered on the work piece all as more further set forth in this specification.

SUMMARY OF THE INVENTION

This invention relates to a work piece holding device for use in conjunction with lathe chuck jaws wherein two sets of two perpendicularly disposed lathe mates having two continuous expansion members around them near their ends are interposed between the centered work piece and the lathe's chuck jaws.

It is the primary object of the present invention to provide for an improved work piece holding apparatus for a lathe that assists in holding a centered work piece within the chuck jaws while not damaging the previous work finish performed.

Another object is to provide for such an apparatus wherein two expandable continuous members are mounted around each of two perpendicularly disposed lathe mates in each chuck jaw and extend between the similarly disposed lathe mates in the two opposite chuck jaws.

These and other objects and advantages of the present invention will become apparent to readers from a consideration of the ensuing description and the accompanying drawings.

BRIEF DESCRIPTION OF THE DRAWINGS

FIG. 1 is a front view of the invention's preferred embodiment showing a work piece mounted between two sets of opposite chuck jaws with each chuck jaw set having a set of lathe mates between it and the work piece.

FIG. 2 is a top view of one of the lathe mates without its expandable members.

FIG. 3 shows a side view of one of the lathe mates without its expandable members.

FIG. 4 shows a front view of the lathe mate without its expandable members.

FIG. 5 shows a top perspective view of one of the lathe mates with its expandable members engaging one of the lathe's chuck jaws.

DESCRIPTION OF THE PREFERRED EMBODIMENT

FIG. 1 is a front view of the invention's preferred embodiment showing a centered work piece 1 mounted in a lathe chuck 2 having two sets of two aligned chuck jaws 3 and 5. Each jaw set is perpendicularly disposed with respect to jaws of the other chuck jaw set. The four shown chuck jaws each have one of the identical lathe mate pads 7, forming the subject matter of the present invention, associated with it and interposed between the chuck jaw and the center work piece. Extending around each of the chuck jaws and its associated lathe mate pad 7 are two expandable rubber straps 9, only one of which is shown for each of the two horizontally disposed chuck jaws of the set designated as set 3. The vertically disposed chuck jaw set 5 would also have two straps 9 associated with each of its mate pads that extends around the pads and their corresponding chuck jaw. Thus, for the four shown work pads and chuck jaws oriented around the work piece there are a total of eight continuous straps 9 that extends around the pads and their corresponding chuck jaw. Thus, for the four shown work pads and chuck jaws oriented around the work piece there are a total of eight continuous expandable rubber bands or straps 9 which are seated in end grooves in the lathe mates. The chuck 2 and its four chuck jaws and the work piece are of conventional design and vary depending on the lathe model involved.

FIG. 2 is a top view of one of the identical lathe mate pads 7 without its two expandable members. The pad can be made of a soft aluminum material with two semi-circular grooves 11 located near opposite ends that extend partially into the pad's surface on three sides. These grooves are used to retain the expandable straps 9 that encircle the pad and extend around the associated chuck jaw and insure that they do not slip out of position.

FIG. 3 shows a side view of one of the lathe mates without its expandable members. The grooves 11 are shown extending into the pad's surface not only on the top surface 13 but on the two side surfaces 17 of the pad. The other non-grooved pad surfaces are generally flat. For example, the front 13 and back 15 pad sides are generally flat. The non-grooved back pad flat surface 15 is the surface which bears against the chuck jaws while the opposite front flat surface 13 engages the work piece 1 as well as the chuck jaw of set 3.

FIG. 4 shows a front view of the lathe mate without its two expandable members. From this view the lathe mate pad 7 appears as a rectangular member having a width considerably greater than its side 17 height. Depicted by dotted lines are the grooved indentations 11 that extend across the pad's width and down the two sides 17 but not into its flat back chuck jaw engaging surface 15.

FIG. 5 shows a top perspective view of one of the lathe mates 7 with its expandable members engaging one of the lathe's chuck jaws of the set 3. The other three lathe mates would engage their respective chuck jaws in a similar manner. The two expandable straps 9 for each chuck jaw and lathe mate are fitted into the grooves 11 that extend partially through the facing surface 13 and its two pad sides 17. Each of the straps encircles the pad and extends around the chuck jaw to hold the pad in place interposed between the jaw and the work piece. When each pad is so positioned on its respective jaw they form a cross like configuration with each chuck jaw end having one pad engaging the held work piece. The continuous expandable strap members 9 are continuous looped expandable members that can be made of rubber or any soft non-marring expandable material which will return to its original shape when not under tension.

In one embodiment the six sided lathe mate 7 was 2 inches in overall length and 2 inches wide. The height for sides 17 was about 0.25 inches wide as was the depth of the four grooved semi-circular indentations 11. Clearly the specific diameters and lengths of the lathe mates can vary depending on the size of the engaged lathe's chuck jaws.

As previously mentioned, the lathe mate pads may be made of a relatively soft metallic material, such as aluminum or brass, to prevent marring of a metallic work surface of any work piece it may come in contact with. The particular material chosen for the lathe mate should be softer than the material making up the work piece to insure it will not mar the work piece's surface which it engages. Thus, if the work piece were a metal material then any soft non-marring metallic material could be used for the lathe mate. If the work piece was made of wood, then rubber or a soft plastic material could be used to construct the lathe mate pad 7. The specific material used for the lathe mates can vary as long as it does not mar the work piece's engaged surface and is functionally able to withstand the rotation effect of the lathe without deterioration.

In use two lathe mates are placed in each chuck jaw set which sets are oriented at right angles with respect to each other such that the mates' four flattened back surfaces 15 engage the four jaws end bearing surfaces 19 as best shown in FIGS. 1 and 5. At the same time, the four sets of two straps 9 each set extend around the four chuck jaws in the two sets to form a work holding media that will not mar the held work piece 1. When so positioned around the work piece, the next lathe operation may be performed on the work piece's surface without the concern that the previous performed operation has been marred beforehand in the work piece centering operation.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An apparatus for assisting in the holding of a lathe held work piece comprising:

a work piece on which a lathe operation is to be performed:

a lathe having at least two opposite chuck jaws to hold said work piece there between, each of said chuck jaws having one lathe mate associated with it;

each of said lathe mates being made of a non-work piece marring material interposed between the chuck jaws and said work piece, each of said lathe mates having a front end surface and adjacent two side surfaces;

each of said lathe mates having two spaced grooved surfaces, said spaced grooved surfaces extending around the front end surface and the adjacent side surfaces of each of the lathe mates; and an expansion member mounted in the two spaced grooved surfaces of each lathe mate disposed within the mate's grooved front end surface and the adjacent side grooved surfaces, said expansion members extending to engage around each of the lathe's chuck jaws whereby said lathe mates are retained with respect to the chuck jaws and positioned to engage a held work piece.

2. The apparatus as claimed in claim 1, wherein said lathe has four chuck jaws formed into two sets which each set being generally perpendicularly disposed with respect to the other jaw set.

3. The apparatus as claimed in claim 1, wherein each of said lathe mates have flattened surfaces that bear against the work piece and the chuck jaws.

4. The apparatus as claimed in claim 3, wherein each of said expansion member is made of a continuous rubber material.

5. The apparatus as claimed in claim 4, wherein the lathe mate is made of a material that is softer than the material of the held work piece.

* * * * *